United States Patent [19]

Maranell et al.

[11] Patent Number: 4,474,387
[45] Date of Patent: Oct. 2, 1984

[54] KICKSTAND SUPPORTING DEVICE

[76] Inventors: Melvin C. Maranell, 1108 Village Rd., 2B, Chaska, Minn. 55381; Steven J. Reichenberger, Box 376, St. Bonifacius, Minn. 55375

[21] Appl. No.: 355,521

[22] Filed: Mar. 8, 1982

[51] Int. Cl.$^3$ ............................................. B62H 3/00
[52] U.S. Cl. .............................. 280/293; 248/188.9; 248/346; 248/357; 254/DIG. 1; 280/763.1
[58] Field of Search ............... 280/293, 298, 301, 304, 280/763, 764; 248/188.9, 346, 357; 254/1, DIG. 1

[56] References Cited

U.S. PATENT DOCUMENTS

| | | | |
|---|---|---|---|
| 761,413 | 5/1904 | Schroer | 254/DIG. 1 |
| 3,712,640 | 1/1973 | Shipman et al. | 280/301 |
| 3,970,330 | 7/1976 | Norcross | 280/301 |
| 4,023,828 | 5/1977 | MacKenzie et al. | 280/764 |
| 4,254,921 | 3/1981 | Stonhaus | 248/357 |

Primary Examiner—Joseph F. Peters, Jr.
Assistant Examiner—Kenneth R. Rice
Attorney, Agent, or Firm—Williamson, Bains, Moore & Hansen

[57] ABSTRACT

A kickstand supporting device usable with motorcycles and other two wheeled vehicles utilizes a rigid plate with obverse and reverse surfaces, an upright wall enclosure being positioned on the obverse face to receive and releaseably retain the base of the vehicle kickstand. A combined centering and spacing fillet is located on the obverse face and adjacent the wall to center the kickstand base and space the kickstand base from the wall. The reverse face of the device may be provided with spiked protrusions to engage the parking surface during use and to help retain the device on the vehicle during travel, a pair of cleats and an elastic strap cooperating with the protrusions to retain the device on the vehicle during travel.

3 Claims, 6 Drawing Figures

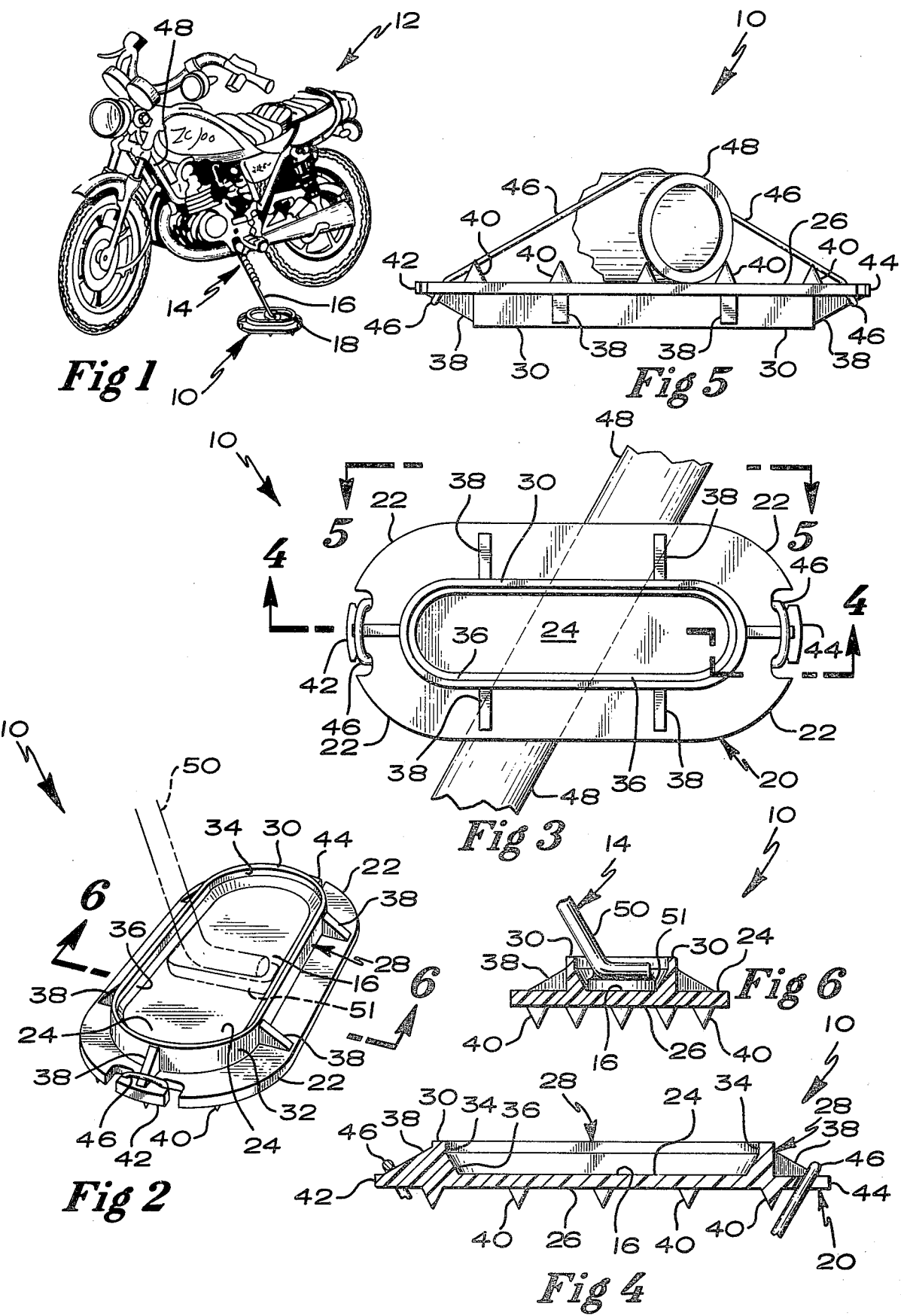

KICKSTAND SUPPORTING DEVICE

BACKGROUND OF THE INVENTION

Most two wheeled vehicles such as motorcycles, mopeds, bicycles and the like are supported during parking by a kickstand which is moveable between a raised travel position and a downwardly extending support position. Many such kickstands are formed of simple circular cross section rods or bars having a narrow base or end which contacts the ground or other parking surface, but variations in such kickstands do exist and include units having small platforms which permanently mount to the base of the kickstand and rest on the parking surface during parking.

Under ideal conditions even a narrow rod type kickstand will adequately support the parked vehicle, as when the kickstand is supported on a solid concrete parking surface. However, when the parking surface is formed of asphalt, sod, sand or other soft or infirm material, the kickstand base frequently sinks into the parking surface, resulting in the eventual collapse or falling of the vehicle. Due to the increasing complexity and value of many modern motorcycles and bicycles, the falling of a vehicle onto a hard parking surface can easily cause damage and breakage to the vehicle components.

The described problem of kickstand sinkage into the parking surface and the resultant falling of the vehicle has been a concern of vehicle designers for a number of years. Generally efforts to solve the problem have been directed toward permanently attaching a small platform to the kickstand base. Examples of such platforms are shown in U.S. Pat. Nos. 3,712,640 and 3,970,330. While the platforms shown in these patents can be helpful if properly attached and aligned, maintaining proper alignment requires constant attention from the operator. It has been found that in practice there is usually a small clearance distance between the rotating rear wheel of the vehicle and the kickstand when the stand is in raised, storage position. The presence of an attached platform on the kickstand as described in the above patents, can easily span the remaining clearance distance, and an unexpected contact between such a platform and the rotating rear wheel can produce jamming and sudden, dangerous vehicle failure. Not only can the platform shift relative to the kickstand to cause such contact, but more frequently the kickstand mounting shifts relative to the vehicle frame in response to the operator shoving the kickstand between raised and supporting positions. These clearance problems and their associated potential dangers have limited the opportunities where permanently attached platforms may be used on kickstands and accordingly have left the problem of kickstand sinkage unsolved. The present invention provides a workable, inexpensive and safe solution to this problem.

SUMMARY OF THE INVENTION

The invention comprises a kickstand supporting device which utilizes a substantially rigid plate which has obverse and reverse surfaces thereon. On the obverse surface is an upwardly extending, continuous wall which is preferably formed integrally with the plate and which releasably retains and surrounds the base of the vehicle kickstand.

The plate further includes a combined centering and spacing fillet which is also integral with the plate and extends adjacent and within the wall and diagonally between the obverse face and the wall.

The reverse face of the plate is provided with a plurality of spaced-apart, spike-like protrusions which aid in stabilizing the plate when on the parking surface. These protrusions also engage the sides of a frame member of the vehicle when being carried and stored so as to aid in retaining the plate against the frame member when secured to the frame member by an elastic strap.

The plate is provided with a pair of spaced-apart cleats which releaseably receive the ends of the elastic strap and cooperate with the spiked protrusions and the strap in retaining the plate against the vehicle frame member during travel of the vehicle. Accordingly, the kickstand supporting device is highly portable and is used to support the kickstand only during parking of the vehicle and is otherwise carried on the vehicle during travel.

The device is easily and inexpensively manufactured, strong and long lasting, and provides a safe and highly portable product to reliably retain the vehicle kickstand in a safe and permanent anchorage so as to prevent vehicle damage.

These and other advantages of the invention will be apparent from the following description and the attached drawings wherein like reference characters refer to the same or similar parts throughout the several views.

BRIEF DESCRIPTION OF THE DRAWINGS

FIG. 1 is a side perspective view of a motorcycle shown with its kickstand extending downwardly onto and supported by a kickstand supporting device embodying the invention.

FIG. 2 is a perspective view of the kickstand supporting device of FIG. 1 with a kickstand shown in phantom.

FIG. 3 is a top elevation view of a kickstand supporting device with the device carried on a frame member of the vehicle.

FIG. 4 is a cross-sectional side view of the kickstand supporting device of FIG. 3 taken in the direction of cutting plane 4—4 of FIG. 3.

FIG. 5 is a top elevation view of the kickstand supporting device of FIG. 3 showing its attachment to a frame member of the vehicle, and taken in the direction of cutting plane 5—5 of FIG. 3.

FIG. 6 is a cross-sectional side elevational view of the kickstand supporting device shown in FIG. 2 and taken in direction of cutting plane 6—6 of FIG. 2.

DESCRIPTION OF THE PREFERRED EMBODIMENT

Referring now to FIG. 1 of the drawings, a two wheeled vehicle such as motorcycle 12 has a swingably mounted kickstand 14 which is movable between a raised storage position and a downwardly extending support position 16 where its base 18 is supported on and retained by a kickstand supporting device 10 embodying the invention.

The device 10 which is shown in greater detail in FIGS. 2-5 includes a substantially rigid plate 20 which is preferably flat and has a generally oval shaped outer periphery 22. The plate 20 which may be integrally formed by molding and is preferably formed of a plastic-like material, has an obverse face 24 and a reverse face 26.

The obverse face has a continuous, upwardly extending wall 28 commencing at obverse face 24 and terminating at rim 30. The wall 28 has an outer surface 32 which is preferably perpendicular to the obverse face 24 and has an inner wall 34 which extends downwardly from the rim 30 to join fillet 36, which will be described further hereafter. The described wall 28 and its inner surface 34 provide an upright wall means on the obverse face 24 for receiving and releaseably retaining the base of the kickstand.

The fillet 36 provides an angled surface which extends continuously within the inner surface 34 of the wall 28 and diagonally between the obverse face 24 and the inner surface 34. This fillet provides a combined centering and spacing means for centering and releaseably retaining the kickstand base within the enclosure provided by wall 28 and spacing the kickstand base from the wall 28.

Positioned around the outer periphery of the wall 28 are a plurality of triangular support members 38 which extend between the face 24 and the outer surface 32 of the wall and are preferably molded integrally with the device 10.

Referring now to FIGS. 4 and 5, the reverse face 26 of the device 10 is provided with a plurality of preferably conical, downwardly extending protrusions 40 which are spaced from one another and have a generally spike-like appearance. These protrusions assist in stabilizing the device 10 on soft sand or sod, into which the protrusions sink to add stability. These protrusions also serve a valuable function when the device 10 is positioned on an asphalt surface in that small rocks or pebbles located beneath the device 10, which could destabilize an ordinary flat platform, are bridged over by the plurality of protrusions 40 to assure needed stability.

The described protrusions also serve an important function in retaining the device on the vehicle 12 during vehicle travel as will be described hereafter.

The plate 20 has a pair of attachment cleats 42 and 44 which are located at opposite ends of the plate and provide attachment means to which a stretchable continuous, circular strap 46 may be releaseably anchored while encircling a frame member 48 of the vehicle. When it is desired to carry the device 10 on the vehicle, the reverse face 26 is positioned against a frame member such as member 48 with the protrusions 40 being placed against the frame member 48 as best shown in FIG. 5 and the strap 46 then stretched tightly across the frame member and secured on the cleats 42 and 44. Accordingly, the cleats 42 and 44, the strap 46 and two or more protrusions 40 cooperate with one another to retain the device 10 securely against a frame member of the vehicle during carrying and storage of the device.

In operation, when it is desired to park the two wheeled vehicle 12, the operator places the kickstand supporting device 10 on the parking surface with the spiked protrusions 40 directed downwardly onto or into the parking surface. The kickstand 14 is swung downwardly to a support position 16 and its base 18 is positioned on the surface 24 within the wall 28, as best shown by the kickstand 50, shown in phantom in FIG. 2, wherein the outer periphery 51 of the base 16 on contacting the angled fillet 36 slips inwardly and is spaced from the wall 28 thereby aiding in centering the kickstand base 16 within the enclosure defined by wall 28 and fillet 36.

As the weight of the vehicle 12 is applied to the obverse face 24, it causes the protrusions 40 to more solidly contact the parking surface so as to frictionally engage the surface and thereby avoid slippage. In soft parking surfaces such as sand or sod, the protrusions will sink into the surface to insure a firm foundational support.

The presence of the interior fillet 36 assures that the base of the kickstand rests more centrally on the obverse face 24 to assure a more even distribution of downwardly directed weight of the vehicle 12 and improved stability of the device 10. Additionally, the presence of the fillet keeps the kickstand base spaced inwardly from the upright wall 28 and thereby reduces rubbing and wear against the wall 28 and increases the useful life of the device 10.

When the vehicle is again to be used for travel, the kickstand is raised to storage position and the supporting device 10 is releaseably attached to the vehicle frame for carrying. To attach the device the operator places the reverse face 26 against a vehicle frame member 48 preferably with two or more protrusions 40 being positioned closely adjacent and contacting the frame member 48 as best shown in FIG. 5. The operator then stretches the elastic strap 46 about the frame member 48 and encircles the cleats 42 and 44 with the strap to thereby securely retain the device 10 to the vehicle during travel. Accordingly, the downwardly extending protrusions 40 closely contact the edges of the frame member 48 and prevent movement of the device 10 relative to the member 48 and cooperate with the strap 46 and cleats 42 and 44 to securely retain the device against the vehicle with a minimum of slippage and rattle.

While the preferred embodiments of the present invention have been described, it should be understood that various changes, adaptions and modifications may be made therein without departing from the spirit of the invention and the scope of the appended claims.

What is claimed is:

1. A kickstand supporting device usable with a two-wheeled vehicle for retaining the base of the vehicle's kickstand to prevent the sinking of the kickstand base into a parking surface beneath the vehicle comprising:
   a plate substantially larger than the kickstand base and having obverse and reverse faces positionable with the obverse face confronting the kickstand base and the reverse face confronting the parking surface;
   said plate including upright wall means on said obverse face for receiving and releaseably retaining the base of the kickstand on said obverse face;
   said plate further including a combined centering and spacing means on said obverse face to releaseably center and retain the kickstand base within said wall means and to space the kickstand base from said wall means; and
   said plate further including a pair of spaced apart cleats positioned on said plate and said device further including a strap for attachment to said cleats and encirclement of a portion of the vehicle so as to retain the device in a carrying position on the vehicle during travel by the vehicle.

2. The kickstand supporting device of claim 1 wherein said device includes a plurality of protrusions extending outwardly from said reverse face and positioned to engage the vehicle when in carrying position, at least two of said protrusions engaging the vehicle and cooperating with said strap and cleats during carrying of the plate on the vehicle to firmly retain the plate on the vehicle.

3. A kickstand supporting device usable with a two wheeled vehicle for retaining the base of the vehicle's kickstand and carryable during travel of the vehicle by attachment to a frame member of the vehicle comprising:

- a plate substantially larger than the kickstand base and having obverse and reverse faces positionable with the obverse face confronting the kickstand base and the reverse face confronting the parking surface;
- said reverse face of said plate further including a plurality of protrusions extending outwardly from said reverse face and positioned thereon to be engageable with the frame member of the vehicle when in a carrying position in close contact against said frame member;
- said plate further including a pair of spaced-apart cleats positioned on said plate; and
- said device further including an elastic strap for attachment to said cleats and encirclement of the frame member, said protrusions, said pair of cleats, and said strap cooperating with one another to firmly retain said plate against the frame member during carrying of the plate on the vehicle.

* * * * *